(12) United States Patent
Gourlay et al.

(10) Patent No.: US 7,720,997 B1
(45) Date of Patent: May 18, 2010

(54) PATH SELECTION SYSTEM

(75) Inventors: Douglas Alan Gourlay, Sausalito, CA (US); James Anthony Aviani, Jr., Santa Barbara, CA (US); Tim Sylvester, Santa Cruz, CA (US); Robert Horst Starmer, Menlo Park, CA (US); Lincoln T. Dale, Prahran (AU)

(73) Assignee: Cisco Technology, Inc., San Jose, CA (US)

( * ) Notice: Subject to any disclaimer, the term of this patent is extended or adjusted under 35 U.S.C. 154(b) by 558 days.

(21) Appl. No.: 10/034,368

(22) Filed: Dec. 19, 2001

(51) Int. Cl.
*G06F 15/16* (2006.01)
*G06F 15/173* (2006.01)
*H04L 12/28* (2006.01)

(52) U.S. Cl. .................. 709/245; 709/238; 370/238

(58) Field of Classification Search .............. 709/203, 709/220, 227–228, 238–239, 245; 790/230; 370/229, 238
See application file for complete search history.

(56) References Cited

U.S. PATENT DOCUMENTS

| 4,827,411 | A | 5/1989 | Arrowood et al. | 364/300 |
|---|---|---|---|---|
| 4,965,772 | A | 10/1990 | Daniel et al. | 364/900 |
| 5,414,704 | A | 5/1995 | Spinney | 370/60 |
| 5,452,447 | A | 9/1995 | Nelson et al. | 395/650 |
| 5,488,412 | A | 1/1996 | Majeti et al. | 348/10 |
| 5,506,987 | A | 4/1996 | Abramson et al. | 395/650 |
| 5,511,208 | A | 4/1996 | Boyles et al. | 395/800 |
| 5,555,244 | A | 9/1996 | Gupta et al. | 370/60.1 |
| 5,586,121 | A | 12/1996 | Moura et al. | 370/404 |
| 5,611,049 | A | 3/1997 | Pitts | 395/200.09 |
| 5,673,265 | A | 9/1997 | Gupta et al. | 370/432 |
| RE35,774 | E | 4/1998 | Moura et al. | 348/12 |
| 5,751,971 | A | 5/1998 | Dobbins et al. | 395/200.68 |
| 5,774,660 | A | 6/1998 | Brendel et al. | 395/200.31 |
| 5,787,470 | A | 7/1998 | DiSimone et al. | 711/124 |
| 5,818,845 | A | 10/1998 | Moura et al. | 370/449 |
| 5,828,655 | A | 10/1998 | Moura et al. | 370/236 |
| 5,848,241 | A | 12/1998 | Misinai et al. | 395/200.43 |
| 5,852,717 | A | 12/1998 | Bhide et al. | 395/200.33 |
| 5,859,852 | A | 1/1999 | Moura et al. | 370/449 |

(Continued)

FOREIGN PATENT DOCUMENTS

WO    WO 98/31107    7/1998

OTHER PUBLICATIONS

RFC 793—Transmission Control Protocol, Sep. 1981, pp. 1-40. http://www.faqs.org/rfcs/rfc793.html.*

(Continued)

*Primary Examiner*—Nathan Flynn
*Assistant Examiner*—Joshua Joo
(74) *Attorney, Agent, or Firm*—Weaver Austin Willeneuve & Sampson LLP (57) ABSTRACT

Methods and apparatus for processing a service request received from a client are disclosed. When a service request is received, a plurality of packets are transmitted, where each of the plurality of packets identify a different type of service via which to send the corresponding packet. In addition, a mapping of each different type of service to an IP address is preferably maintained, thereby enabling the service request to be processed via an IP address associated with a type of service identified in a first one of the plurality of packets to be received.

31 Claims, 6 Drawing Sheets

U.S. PATENT DOCUMENTS

| | | | | |
|---|---|---|---|---|
| 5,872,773 | A | 2/1999 | Katzela et al. | 370/256 |
| 5,892,903 | A | 4/1999 | Klaus | 395/187.01 |
| 5,946,047 | A | 8/1999 | Levan | 348/473 |
| 5,946,048 | A | 8/1999 | Levan | 348/473 |
| 5,950,205 | A | 9/1999 | Aviani, Jr. | 707/103 |
| 5,953,335 | A | 9/1999 | Erimli et al. | 370/390 |
| 5,956,346 | A | 9/1999 | Levan | 370/480 |
| 5,959,660 | A | 9/1999 | Levan | 348/12 |
| 5,959,968 | A | 9/1999 | Chin et al. | 370/216 |
| 5,959,997 | A | 9/1999 | Moura et al. | 370/404 |
| 5,989,060 | A | 11/1999 | Coile et al. | 439/489 |
| 6,006,264 | A | 12/1999 | Colby et al. | 709/226 |
| 6,006,266 | A | 12/1999 | Murphy, Jr. et al. | 709/227 |
| 6,016,388 | A | 1/2000 | Dillon | 395/200.72 |
| 6,052,718 | A | 4/2000 | Gifford | 709/219 |
| 6,182,139 | B1* | 1/2001 | Brendel | 709/226 |
| 6,272,550 | B1* | 8/2001 | Deng et al. | 709/246 |
| 6,298,380 | B1* | 10/2001 | Coile et al. | 709/227 |
| 6,304,913 | B1* | 10/2001 | Rune | 709/241 |
| 6,345,294 | B1 | 2/2002 | O'Toole et al. | 709/222 |
| 6,411,986 | B1* | 6/2002 | Susai et al. | 709/203 |
| 6,430,623 | B1* | 8/2002 | Alkhatib | 709/245 |
| 6,587,438 | B1* | 7/2003 | Brendel | 370/238 |
| 6,789,125 | B1* | 9/2004 | Aviani et al. | 709/238 |
| 6,810,411 | B1* | 10/2004 | Coughlin et al. | 709/203 |
| 6,810,421 | B1* | 10/2004 | Ishizaki et al. | 709/226 |
| 6,950,429 | B2* | 9/2005 | Benayoun et al. | 370/389 |
| 7,103,651 | B2* | 9/2006 | Bohannon et al. | 709/223 |
| 2002/0112036 | A1* | 8/2002 | Bohannon et al. | 709/220 |
| 2005/0172011 | A1* | 8/2005 | Gourlay et al. | 709/219 |

OTHER PUBLICATIONS

Aviani et al., *Wide Area Load Balancing Of Web Traffic*, filed Jun. 28, 2000, U.S. Appl. No. 09/606,418.

Aviani et al., *Distributed Network Traffic Load Balancing Technique Implemented Without Gateway Router*, filed May 10, 2000, U.S. Appl. No. 09/569,090.

Cieslak et al., *Network Cache-Based Content Routing*, filed Jun. 5, 2000, U.S. Appl. No. 09/588,027.

Gourlay et al., *Phased Learning Approach To Determining Closest Content Serving Sites*, filed Aug. 31, 2000, U.S. Appl. No. 09/652,766.

U.S. Appl. No. 60/160,535, filed Oct. 20, 1999, Lu et al.

U.S. Appl. No. 60/177,415, filed Jan. 21, 2000, Kirk Johnson.

U.S. Appl. No. 60/177,985, filed Jan. 25, 2000, O'Toole et al.

U.S. Appl. No. 60/178,062, filed Jan. 24, 2000, Johnson et al.

U.S. Appl. No. 60/178,063, filed Jan. 24, 2000, Lu et al.

U.S. Appl. No. 09/294,837, filed Apr. 19, 1999, Johnson et al.

Akamai Technologies, Inc.—Global Internet Content Delivery, "How FreeFlow Works," May 4, 2000, webmaster@akamai.com, pp. 1-3.

Arlitt, Martin; Cherkasova, Ludmila; Dilley, John; Friedrich, Rich and Jin, Tai Tai, "Evaluating Content Management Techniques For Web Proxy Caches," Apr. 30, 1999, *Hewlett-Packard Laboratories*, pp. 1-9.

Digital Island, Inc. -e-Business Without Limits-, "Enabling Technologies," no date, http://www.digisle.net, pp. 1-2.

Eager, Derek L.; Lazowska, Edward D. and Zahorjan, John, "Adaptive Load Sharing in Homogeneous Distributed Systems," May 1986, *IEEE Transactions on Software Engineering*, vol. SE-12, No. 5, pp. 662-675.

Hanks, S.; Li, T.; Farinacci, D. and Traina, P., Request For Comments No. 1701, entitled "Generic Routing Encapsulation (GRE)," Jan. 2000, *Internet Engineering Task Force*, pp. 1-7.

Information Sciences Institute, Request for Comments No. 793, entitled "Transmission Control Protocol—DARPA Internet Program—Protocol Specification," Sep. 1981, *Internet Engineering Task Force*, pp. 1-49.

Internap, "Preferred Collocation Services," Copyright © 2001 *Internap Network Services Corporation*, http://www.internap.com, pp. 1-2.

Mockapetris, P., Request For Comments No. 1034, entitled "Domain Names—Concepts and Facilities," Nov. 1987, *Internet Engineering Task Force*, http://ietf.org/rfc/rfc1034.txt?number=1034, pp. 1-48.

Ousterhout, John K., "Beating the I/O Bottleneck: A Case for Log-Structured File Systems," Jan. 30, 1992, *Computer Science Division, Electrical Engineering and Computer Sciences*, University of California, Berkeley, CA, pp. 1-17.

Ousterhout, John K.; Da Costa, Hervé; Harrison, David; Kunze, John A.; Kupfer, Mike and Thompson, James G., "A Trace-Driven Analysis of the UNIX 4.2 BSD File System," Jan. 2, 1993, *Computer Science Division, Electrical Engineering and Computer Science*, University of California, Berkeley, CA 94720, pp. 1-23.

Valloppillil, Vinod, "Cache Array Routing Protocol v1.0", Oct. 20, 1997, Internet-Draft, http://ds1.internic/net/internet-drafts/draft-vinod-carp-v1-02.txt, pp. 1-6.

Welch, Brent, "A Comparison of the Vnode and Sprite File System Architectures," May 1992, *Proceedings of the File System Workshop*, pp. 29-44.

\* cited by examiner

Content router configuration – DNS mode

A-records — 302

| IP address1 | Domain name1 | Type of service1 |
|---|---|---|
| IP address2 | Domain name2 | Type of service2 |

TCP packet

| Sequence number | Acknowledgement number | Acknowledgement flag |
|---|---|---|
| Synchronize flag | Reserved (type of service) | |

Mapping – TCP mode

| IP address1 | Type of service1 |
|---|---|
| IP address2 | Type of service2 |

PATH SELECTION SYSTEM

BACKGROUND OF THE INVENTION

1. Field of the Invention

The present invention relates generally to traffic redirection in a distributed system. More particularly, the present invention relates to a method and apparatus for redirecting traffic to a particular network location.

2. Description of the Related Art

A computer network may be defined as an interconnected collection of autonomous computers. In a distributed system, the existence of these multiple autonomous computers is transparent to the user. To achieve this transparency, allocation of jobs to processors and all other system functions must be automatic. These automated system functions are typically provided by an operating system.

In general, the operating system hides the details of the hardware from the user and provides the user with a convenient interface for using the system. More particularly, the operating system is responsible for allocating resources within the distributed system and schedules the execution of various services accordingly. Thus, the operating system selects the best processor, locates and transfers all corresponding service requests to the appropriate location. In this marnier, the operating system ensures that system resources such as file servers are used in an efficient manner.

The resource allocation provided by the operating system includes the retrieval and processing of data. Often, this data is stored on one or more shared file servers. Users in such a system are called clients. Communication from a client generally comprises a request message asking for a particular service to be performed. The service request message is then sent to an appropriate server. The server then does the work requested and sends back a reply. Thus, data is accessed and processed by the server in accordance with the service request message.

Similarly to allocating resources among multiple servers in a simple network, it is also important to appropriately allocate client requests among servers on the Internet. For instance, redundant data centers are often required in order to provide a backup in the event of failure of one of the data centers. Thus, when there are globally distributed data centers that provide the same content, various metrics are often used to select the optimum site to which to send a client request.

When a client requests access to a particular Internet domain name on the Internet, this domain name must be translated to an Internet Protocol (IP) address. More particularly, the Domain Name System (DNS) is used to map domain names of hosts and clients on the Internet to their corresponding IP addresses. Since a central list of domain name-IP address mappings would be impractical, such lists are distributed throughout the Internet in various DNS servers. By way of example, a client typically sends a DNS query to a DNS server that includes a host name with an indication that an IP address is requested. The DNS server then returns an IP address associated with the host name.

Ping is a basic Internet program that enables a client to verify that a particular IP address exists and that the host can accept requests. More particularly, ping is typically used diagnostically to ensure that a host computer is actually operating. Ping is also used with a host that is operating to determine how long it takes to get a response back. Ping operates by sending a packet to a designated address and waiting for a response.

Figure 1:
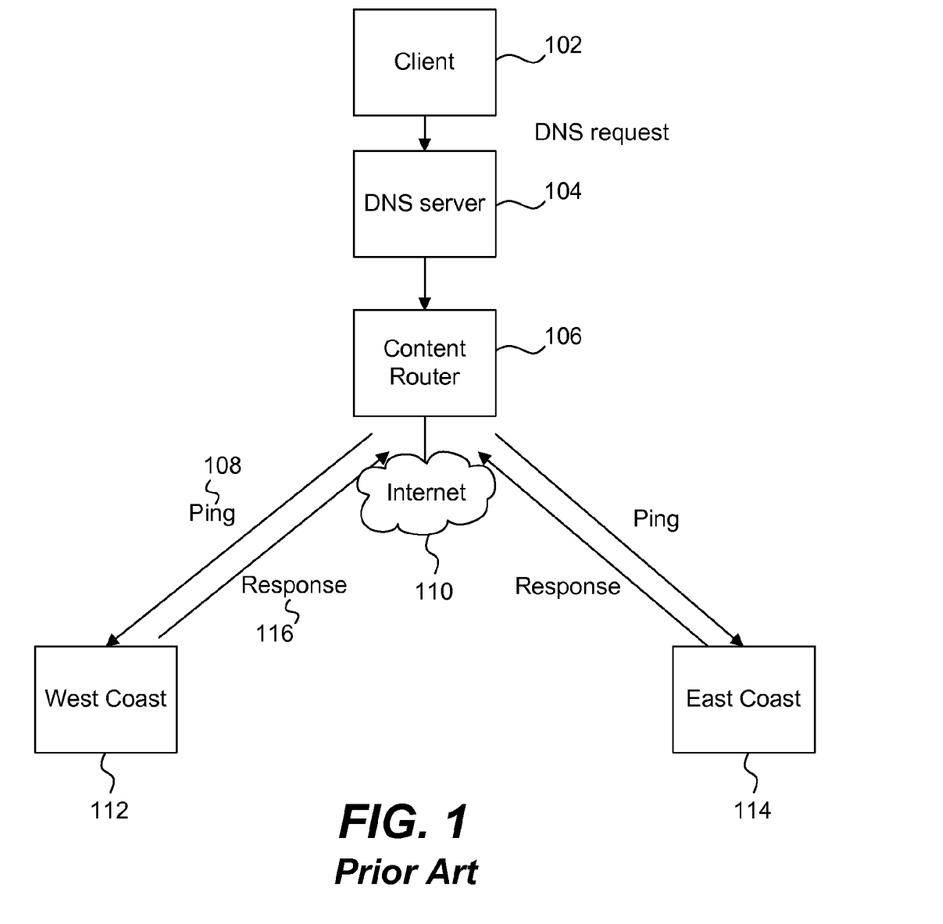
FIG. 1 is a diagram illustrating a prior art method for determining an optimum path for processing a web request.

FIG. 1 is a diagram illustrating a system in which a round-trip-response time metric is used to determine the optimum route among multiple possible routes. More particularly, when a client 102 sends a DNS query to a DNS server 104, the DNS server 104 sends a query to a content router 106 capable of determining the optimum route via which to send a client request. As shown, the content router 106 holding the client request sends a "ping" packet 108 to multiple routers 112, 114. For instance, the routers 112, 114 may be located at geographically disparate locations. Each router receiving a "ping" packet responds back to the content router 106 with a response 116 that indicates the total round-trip time. In other words, the total round-trip time is calculated by adding the time that the "ping" packet 108 travels from the content router 106 to one of the routers 112, 114 and the time that the response packet 116 travels back to the content router 106. In this manner, the content router 106 is able to measure the latency of response time from various disparate, geographically located servers or routers 112, 114. The content router 106 then informs the client DNS server 104 which server 112, 114 is closest. The client DNS server 104 then informs the client 102 which server is the most accessible server. The DNS server 104 then connects the client 102 to the appropriate web site.

Although the round-trip-response time metric is a valuable tool that may be used to determine the most efficient route and therefore the most appropriate web server to send a request, there are several drawbacks to this approach. First, the ping packet is often blocked by firewalls. Second, another method using TCP syn ack packets may look like a security denial of a service attack. As a result, another "boomerang" race system is also commonly used to determine the optimum route for routing of client requests.

Both the round-trip-response time metric and the boomerang race system methods are valuable in determining a fastest link among multiple links. However, such calculations rely upon the premise that these travel times are static. In other words, these calculations do not take into consideration that transmission times rely, at least in part, upon network availability of service providers of the Internet. Accordingly, neither of these methods is capable of determining a fastest provider from among multiple facilities or service providers. It would therefore be desirable if a mechanism were provided to enable the optimum service provider to be selected dynamically among multiple service providers on a per transaction basis.

While the Domain Name System is important in locating a particular web site or domain name on the Internet, the Hypertext Transfer Protocol (HTTP) is important in exchanging files on the World Wide Web. Each web server contains an HTTP daemon that is designed to wait for HTTP requests and handle them when they arrive. A web browser is an example of a HTTP client that sends requests to server machines. When the browser user enters a file request by "opening" a web file (e.g., by typing in a Uniform Resource Locator) or clicking on a hypertext link, the browser builds an HTTP request and sends it to the IP address indicated by the URL. The HTTP daemon in the destination server machine receives the request and, after any necessary processing, the requested file is returned.

When an HTTP request is processed, it is sent to a particular HTTP server. As described above, various metrics have been implemented for selecting a suitable server on the Internet. However, existing metrics only consider the link between the client's DNS server and the server that the client is attempting to reach. Thus, it would also be desirable if a mechanism for selecting the optimum server (or link) via a preferred service provider could be implemented that takes into account the entire network, from client to server, when making server site selections.

In view of the above, a system and method for redirecting traffic in a distributed system according to individual service provider capabilities would be desirable.

SUMMARY OF THE INVENTION

The present invention enables a service request received from a client to be routed to an optimum service provider for processing. This may be accomplished in two different modes: DNS mode and HTTP mode. In either of these modes, the present invention enables a service request to be processed by a type of service (e.g., service provider) that is determined dynamically to be the most efficient and available network for that particular transaction.

In accordance with one embodiment, a network device is configured for performing a method of processing a service request. For example, the service request may be a TCP connection request or a DNS request. When a service request is received, a plurality of packets are sent in response to receiving the service request, where each of the plurality of packets identify a different type of service via which to send the corresponding packet. In addition, the network device maintains a mapping of each different type of service to an IP address. The first one of the plurality of packets to be received may then be used to identify the "winning" type of service (e.g., service provider). Since a mapping of an IP address corresponding to the winning service is maintained, an IP address associated with the winning service may easily be obtained (or provided in the plurality of packets). In this manner, the service request may be processed via an IP address associated with a type of service identified in a first one of the plurality of packets to be received.

In accordance one aspect of the invention, a network device is configured for operating in DNS mode to perform a method of processing a DNS request. First, a DNS request indicating a domain name for which an IP address is requested is received. The network device then transmits a plurality of DNS responses, where each of the plurality of DNS responses is transmitted via a different path associated with a different type of service. Each type of service is mapped to a different IP address. Thus, each of the plurality of DNS responses may include either an IP address associated with the type of service via which the DNS response is transmitted. Alternatively, each of the DNS responses may include a type of service field that identifies the type of service. The DNS responses may then be routed via one or more intermediate routers configured to perform next-hop policy based routing based upon the type of service. The first DNS response to travel through its corresponding path "wins." For instance, the first DNS response to be received via an intermediate client DNS server that received the initial DNS request from the client is the winning response. In this manner, the optimum route and therefore the fastest, most efficient service provider for that particular transaction may be identified. The client DNS server may then discard all subsequently received DNS responses. The client DNS server may then respond with the winning service to the client. For example, the client DNS server may obtain the IP address of the winning type of service from a table that maps each type of service to a different IP address. In this manner, the client may receive the best IP address for their service type via which to send a TCP packet to initiate a TCP connection.

In accordance with another aspect of the invention, a network device is configured to perform a method of operating in HTTP mode to establish a TCP connection. First, a TCP connection request is received from a client. The network device then sends a plurality of TCP acknowledgement packets to the client via a plurality of paths, each of the plurality of paths corresponding to a different type of service. An acknowledgment message is then received from the client that indicates receipt of one of the plurality of TCP acknowledgement packets sent by the network device. The network device then ascertains the type of service via which the TCP acknowledgement packet received by the client was transmitted. An HTTP redirect is then provided to an IP address corresponding to the type of service.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 2:
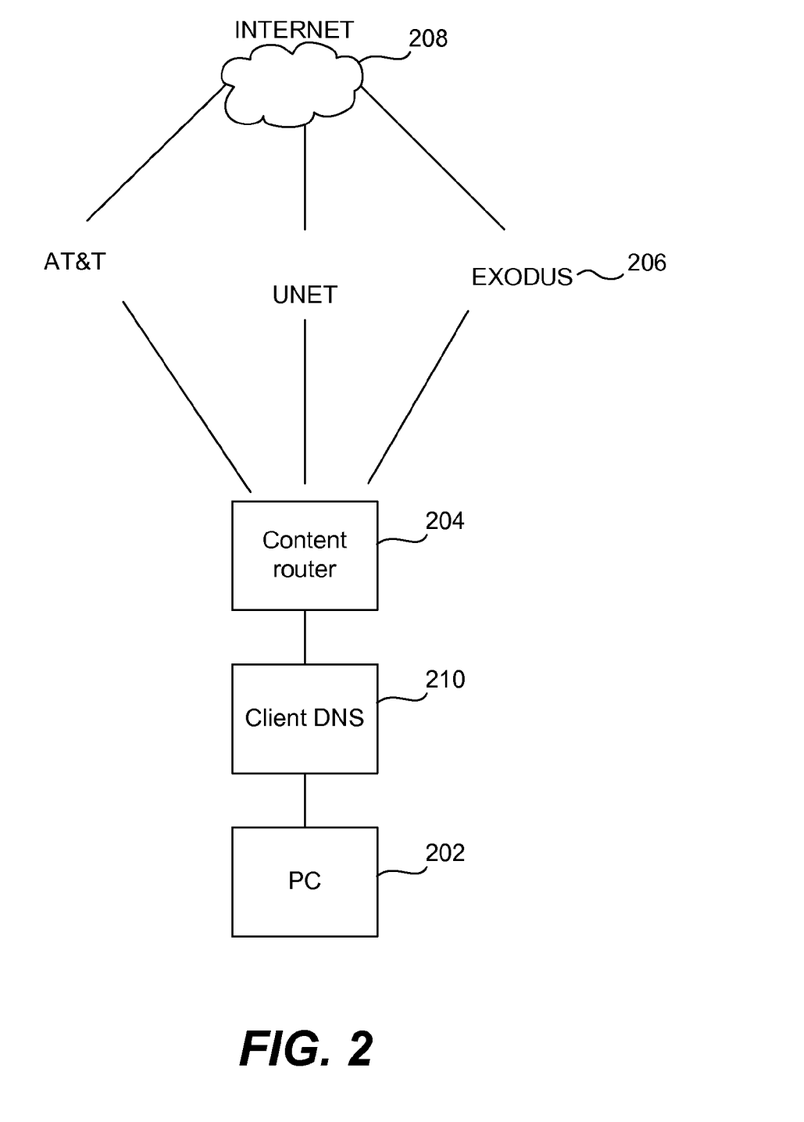
FIG. 2 is diagram illustrating a distributed system in which embodiments of the present invention may be implemented.

FIG. 2 is a block diagram illustrating a system in which the present invention may be implemented. As shown, a client 202 attempts to access a particular web site or document on the Internet. More particularly, the client 202 enters a domain name or a file name. For instance, web file name may be selected by clicking on a hypertext link or by typing in a Uniform Resource Locator (URL). When the client sends a HTTP request or a DNS request, such a request is processed by a content router 204 capable of identifying an optimum service provider 206 on the Internet 208 for processing a transaction request received from the client 202. Although a single content router is illustrated, multiple content routers may be implemented.

The present invention may operate in two different modes. A DNS mode operates to enable a DNS request to be processed by one of multiple service providers. Similarly, an HTTP mode enables an HTTP request to be processed by an optimum service provider. This is accomplished, in part, through a content router such as that illustrated in FIG. 2. While the client 202 may be connected directly to the content router 204, the client need not connect directly to the content router 204. For instance, as shown in FIG. 2, a client DNS server 210 may operate to intercept DNS requests from the client 202 and send "proxy" requests to an appropriate content router 204.

Figure 3:
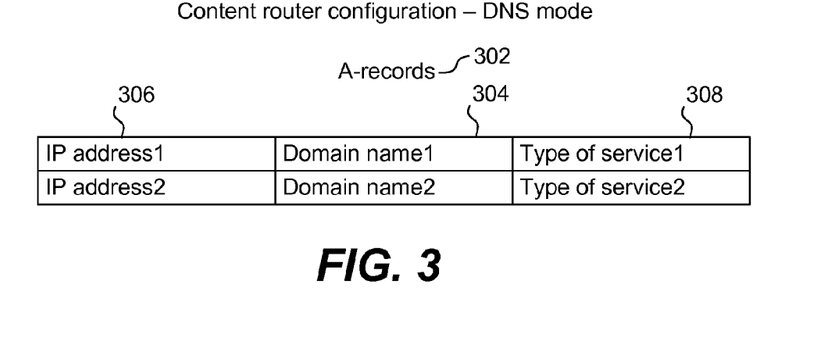
FIG. 3 is a diagram illustrating an exemplary configuration of A-records that may be used by a content router in DNS mode to associate a different IP address with each type of service.

In accordance with the DNS mode, each content router is configured with one or more A-records. An A-record is a record type that is used to translate a domain name into an IP address. In other words, each A-record provides a domain name to IP-address mapping. Thus, in order to assist in a service provider selection, the content router stores IP addresses for multiple service providers. FIG. 3 is an exemplary diagram illustrating a configuration of A-records that may be provided for a content router. As shown, each A-record 302 maps a domain name 304 to an IP address 306. More particularly, each IP address 306 corresponds to a type of service, or service provider. For example, various service providers may have negotiated different types of service (e.g., low latency, standard latency, or best effort). In addition, a type of service may be used to provide general end-to-end classification information regarding how to transmit content, as well as how to queue or otherwise modify traffic flow. Thus, each A-record 302 may further map the corresponding IP address 306 to a type of service 308.

Figure 4:
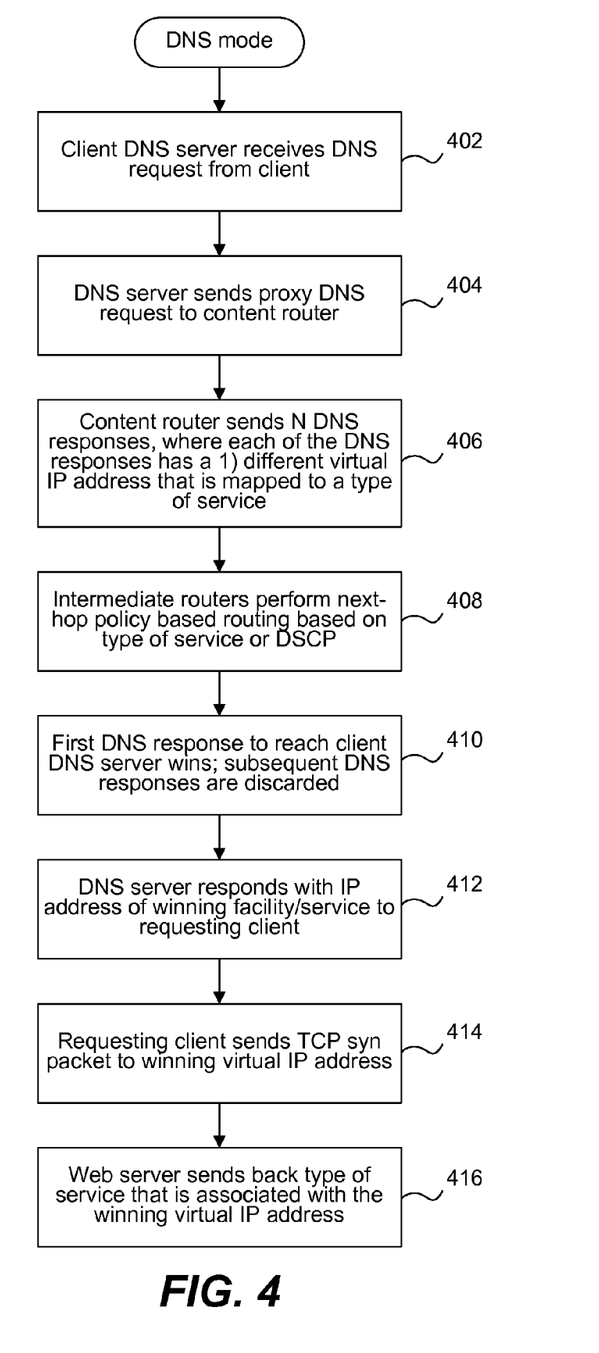
FIG. 4 is a process flow diagram illustrating a method of processing a DNS request to provide a requesting client with an IP address associated with an optimum type of service (e.g., service provider) in accordance with one embodiment of the invention.

FIG. 4 is a process flow diagram illustrating a method of operating in DNS mode to ensure that the fastest and most available service provider receives a DNS request. As described above, a client DNS server may intercept DNS requests and send proxy DNS requests to an appropriate content router. When a client DNS server receives a DNS request from a client as shown at block 402, the client DNS server sends a proxy DNS request to a content router at block 404. More particularly, sending a DNS request comprises composing an A-record request that requests an IP address corresponding to a domain name. When the content router receives an A-record request, the content router sends a plurality of DNS responses at block 406 to the client DNS server via different paths. More particularly, each of the plurality of DNS responses is sent to the client DNS server via a different type of service or service provider, where each DNS response provides a different IP address in response to the DNS request that corresponds to a different type of service, service, or service provider. For purposes of this application, the term type of service will be used interchangeably with the terms service and service provider. However, the source address and destination addresses of each DNS response are preferably identical. More particularly, each IP address provided in a DNS response is mapped to a type of service, service, or service provider. Alternatively, in addition to or instead of the IP address that is mapped to a type of service, the DNS response may include a service identifier field or type of service field that identifies a service, type of service, or service provider. Similarly to the DNS request, each DNS response is provided as an A-record response.

Once the DNS responses are sent by the content router, intermediate routers perform next-hop policy based routing at block 408. More particularly, each of the intermediate routers is preferably configured to route based upon the TOS field of the DNS responses. For instance, the next-hop routing may be performed based on type of service (TOS) or differentiated services code point (DSCP), which is an extension to TOS. In other words, each DNS response is routed via a different TOS or service provider/facility. The first DNS response to reach the client DNS server "wins," as shown at block 410. Subsequent DNS responses are discarded by the client DNS server. In this manner, it is possible to determine the fastest and most available network per request. When the client DNS server receives the "winning" DNS response (e.g., A-record), it determines from the A-record the IP address of the winning facility or service and provides this IP address to the requesting client at block 412. More particularly, the IP address may be obtained in variety of ways depending upon the format of the DNS response (e.g., A-record). As one example, if the response includes a different IP address that is mapped to a type of service, service, or service provider, this IP address may be obtained from the DNS response directly. As another example, if the response includes a type of service field, the client DNS server may obtain the IP address mapped to the type of service from a table maintained by the client DNS server. The requesting client sends a TCP packet with its synchronize (SYN) flag set to the winning IP address in order to open a TCP connection at block 414. The web server associated with the service provider mapped to the winning IP address then provides service at block 416.

Figure 5:
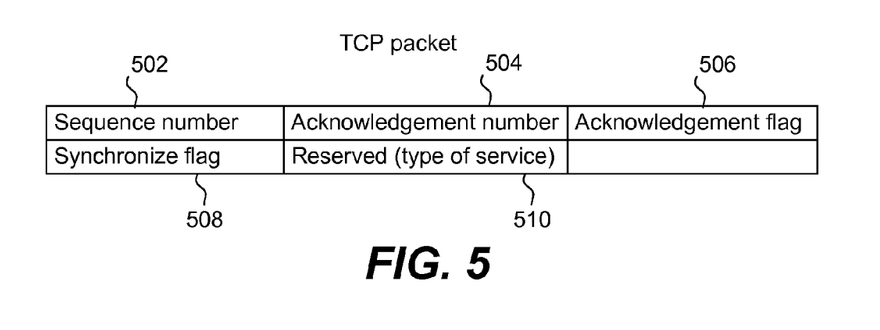
FIG. 5 is a diagram illustrating an exemplary TCP packet and fields that may be used in the TCP packet to implement an HTTP mode in accordance with one embodiment of the present invention.

The HTTP mode leverages the information provided in a TCP packet to enable HTTP requests to be routed to the optimum service provider. As shown in FIG. 5, a TCP packet includes several fields that are pertinent to various embodiments of the invention. As shown, a sequence number field 502 includes a sequence number of the first data byte in the TCP packet being transmitted. An acknowledgement number 504 is the next sequence number the sender of the packet expects to receive. An acknowledgement flag 506 indicates whether the acknowledgement number 504 is valid. In other words, when the acknowledgement flag 506 is set, this acknowledges that data has been received. A SYN flag 508 is set for the opening packets of a TCP connection. In addition, a reserved field 510 may be used to indicate a type of service.

Figure 6:
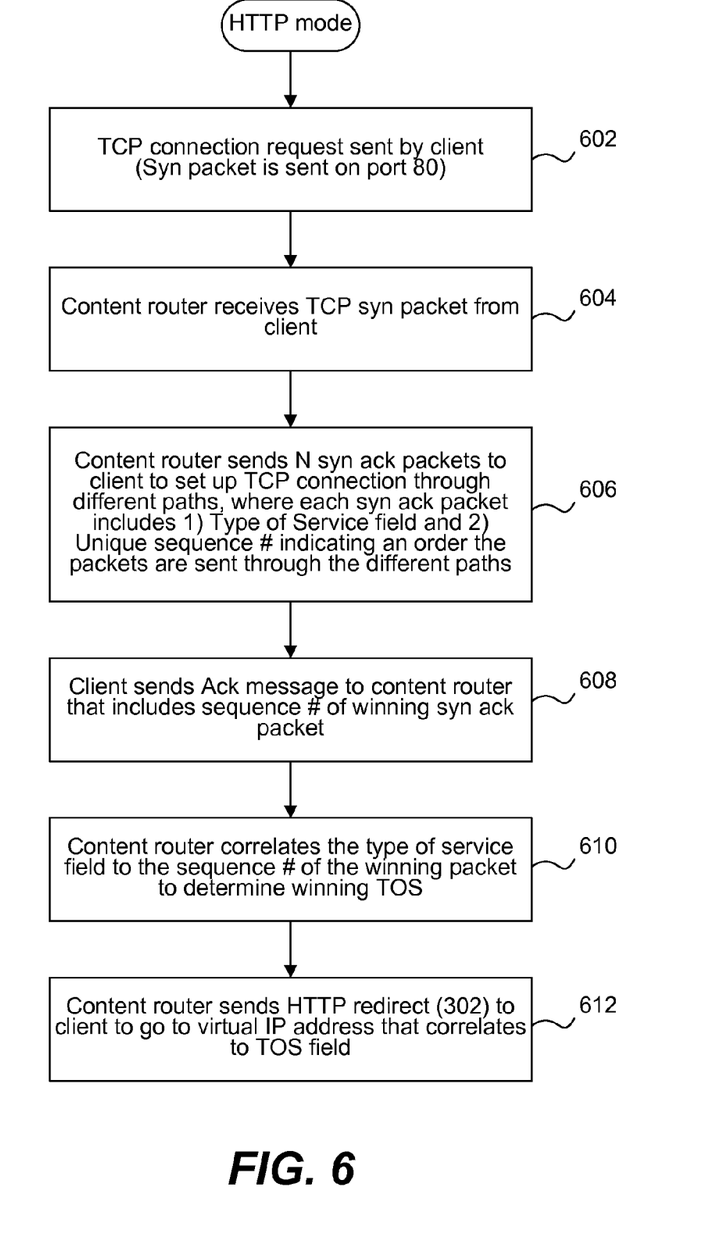
FIG. 6 is a process flow diagram illustrating one method of processing an HTTP request to redirect a client to an IP address associated with an optimum type of service (e.g., service provider).
Figure 7:
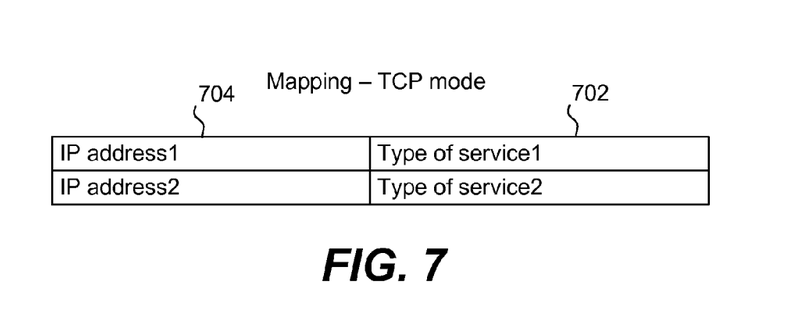
FIG. 7 is a diagram illustrating an exemplary mapping table that may be used by a content router to map each type of service with a different IP address in accordance with one embodiment of the invention.

In accordance with the HTTP mode, an HTTP request is sent by a client at block 602. More particularly, a TCP connection request is sent by the client by sending a TCP packet with its SYN flag set (i.e., TCP syn packet) on port 80. The content router receives the TCP syn packet from the client at block 604. The content router then sends N TCP packets with both the SYN and ACK flags set (i.e., TCP syn ack packets) to the client to attempt to set up a TCP connection through multiple paths as shown at block 606. More particularly, through encapsulating the packet, each of the N TCP packets are sent via a different type of service that is identified within the corresponding TCP packet. This is accomplished as described above with reference to the DNS mode, since the intermediate routers are configured to perform next-hop routing based upon the type of service specified in the TCP packets. In addition, the sequence number in each TCP packet sent by the content router indicates an order that the TCP packets are sent through the different paths. In order to identify a type of service, each TCP packet preferably further identifies a type of service. This may be accomplished by indicating the type of service in the reserved field as described above with reference to block 510 of FIG. 5. The optimum service provider will deliver that TCP packet sent from the content router at block 606 the fastest. When the client receives this TCP packet, the client sends a TCP ack packet at block 608 that includes the sequence number of the winning TCP syn ack packet. This TCP ack packet acknowledges the receipt of the winning TCP syn ack packet. The content router then correlates the type of service field to the sequence number of the winning packet at block 610 to determine the winning type of service. In other words, the content router obtains the sequence number of the winning packet from the message sent by the client and determines the type of service (e.g., from the type of service field of the TCP packet previously sent by the content router) associated with the sequence number of the winning packet. The content router then sends an HTTP redirect to the client to the IP address that correlates to the type of service field at block 612. More particularly, as shown in FIG. 7, the content router may store a table that maps each type of service or service provider 702 to a corresponding IP address 704. In this manner, the appropriate IP address may be provided in the HTTP redirect.

Other Embodiments

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, the content router, DNS server, and intermediate routers of this invention may be specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 8:
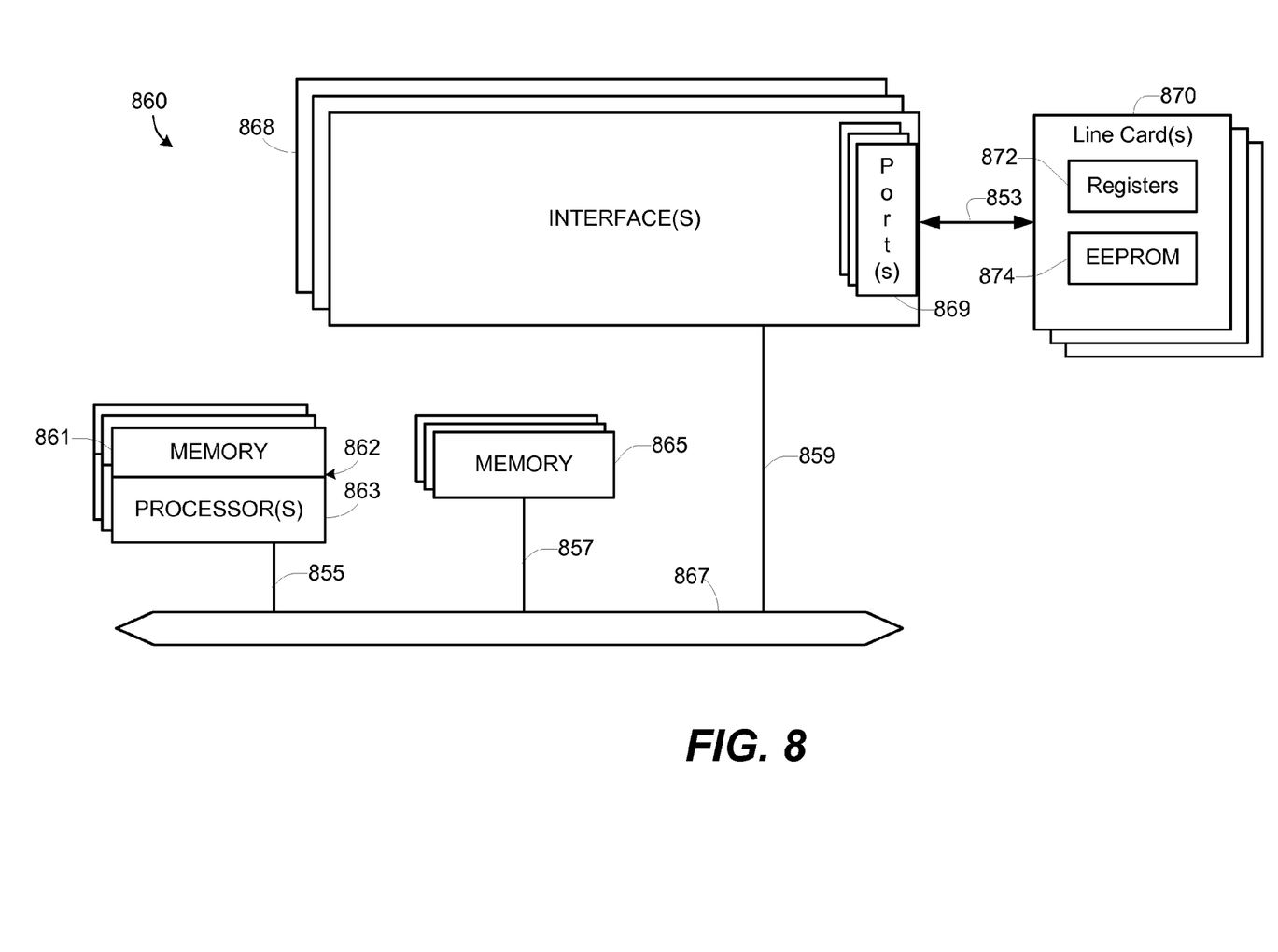
FIG. 8 is a diagram illustrating a network device in which embodiments of the content router, intermediate routers, and the client DNS server of the present invention may be implemented.

Referring now to FIG. 8, a network device 860 suitable for implementing the techniques of the present invention includes a master central processing unit (CPU) 862, interfaces 868, and a bus 867 (e.g., a PCI bus). When acting under the control of appropriate software or firmware, the CPU 862 may be responsible for implementing specific functions associated with the functions of a desired network device. For example, when configured as an intermediate router, the CPU 862 may be responsible for analyzing packets, encapsulating packets, forwarding packets to appropriate network devices, the content router, or client DNS server, etc. The CPU 862 preferably accomplishes all these functions under the control of software including an operating system (e.g. Windows NT), and any appropriate applications software.

CPU 862 may include one or more processors 863 such as a processor from the Motorola family of microprocessors or the MIPS family of microprocessors. In an alternative embodiment, processor 863 is specially designed hardware for controlling the operations of network device 860. In a specific embodiment, a memory 861 (such as non-volatile RAM and/or ROM) also forms part of CPU 862. However, there are many different ways in which memory could be coupled to the system. Memory block 861 may be used for a variety of purposes such as, for example, caching and/or storing data, programming instructions, etc.

The interfaces 868 are typically provided as interface cards (sometimes referred to as "line cards"). Generally, they control the sending and receiving of data packets over the network and sometimes support other peripherals used with the network device 860. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 8 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 865) configured to store data, program instructions for the general-purpose network operations and/or other information relating to the functionality of the techniques described herein. The program instructions may control the operation of an operating system and/or one or more applications, for example. The memory or memories may also be configured to include a mapping of IP addresses to an associated type of service, as well as a plurality of A-records for use by a content router in the DNS mode, etc.

Because such information and program instructions may be employed to implement the systems/methods described herein, the present invention relates to machine readable media and computer-readable medium that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate transmission medium such as airwaves, optical lines, electric Lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being implemented and capable of operating in DNS mode or HTTP redirect mode. However, it should be understood that the invention is not limited to such implementations, but instead would equally apply regardless of the context and system in which it is implemented. Thus, broadly speaking, the operations described above may be used to distribute traffic in a distributed system based on a type of service (e.g., service, service provider, network connection or domain) that is determined to provide the optimum and most efficient path. Thus, although the service request is described as a TCP connection request or a DNS request, the service request may be implemented using other connection initiation protocols as well. In addition, the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. A network device adapted for processing a service request, comprising:
    a processor; and
    a memory, at least one of the processor or the memory being adapted for:
    receiving a service request;
    sending a plurality of response packets in response to receiving the service request, each of the plurality of response packets identifying a different type of service via which to send a corresponding one of the plurality of response packets, wherein the type of service directly corresponds to a Service Provider of the Internet such that each of the plurality of response packets is sent via a different one of a plurality of Service Providers of the Internet;
    maintaining a mapping of each different type of service to an IP address, thereby enabling the service request to be processed via an IP address associated with a type of service identified in a first one of the plurality of response packets to be received, wherein the type of service identified in the first one of the plurality of response packets to be received identifies one of the plurality of Service Providers of the Internet; and
    providing the IP address of the one of the plurality of Service Providers of the Internet that is mapped to the type of service identified in the first one of the plurality of response packets to be received;
    wherein maintaining the mapping comprises maintaining a plurality of A-records, each of the A-records having a type of service field adapted for indicating a type of service that corresponds to one of the plurality of Service Providers of the Internet and wherein receiving the request comprises receiving a DNS A-record request.

2. The network device as recited in claim 1, wherein each of the plurality of response packets is a DNS response.

3. The network device as recited in claim 1, wherein the type of service indicates a specific network connection or domain.

4. In a network device, a method of processing a service request, comprising:
    receiving a service request;
    sending a plurality of packets in response to receiving the service request, each of the plurality of packets identifying a different type of service via which to send a corresponding one of the plurality of response packets, wherein the type of service identifies a Service Provider of the Internet such that each of the plurality of response packets identifies a different one of a plurality of Service Providers of the Internet; and
    maintaining a mapping of each different type of service to an IP address, thereby enabling the service request to be processed via an IP address associated with a type of service identified in a first one of the plurality of packets to be received, wherein the type of service identified in the first one of the plurality of packets to be received identifies one of the plurality of Service Providers of the Internet; and
    providing the IP address of the one of the plurality of Service Providers of the Internet that is mapped to the type of service identified in the first one of the plurality of response packets to be received;
    wherein maintaining the mapping comprises maintaining a plurality of A-records, each of the A-records having a type of service field adapted for indicating a type of service that corresponds to one of the plurality of Service Providers of the Internet and wherein receiving the request comprises receiving a DNS A-record request.

5. A non-transitory computer-readable medium comprising memory, the computer readable medium storing thereon instructions for processing a service request in a network device, the computer-readable medium storing thereon:
    instructions for sending a plurality of response packets in response to receiving a service request, each of the plurality of response packets identifying a different type of service via which to send a corresponding one of the plurality of response packets, wherein the type of service identifies a Service Provider of the Internet such that each of the plurality of response packets identifies a different one of the plurality of Service Providers of the Internet;
    instructions for maintaining a mapping of each different type of service to an IP address, thereby enabling the service request to be processed via an IP address associated with a type of service identified in a first one of the plurality of response packets to be received, wherein the type of service identified in the first one of the plurality of response packets to be received identifies one of the plurality of Service Providers of the Internet; and
    instructions for providing the IP address of the one of the plurality of Service Providers of the Internet that is mapped to the type of service identified in the first one of the plurality of response packets to be received;
    wherein maintaining the mapping comprises maintaining a plurality of A-records, each of the A-records having a type of service field adapted for indicating a type of service that corresponds to one of the plurality of Service Providers of the Internet and wherein receiving the request comprises receiving a DNS A-record request.

6. A network device adapted for processing a service request, comprising:
    a processor and a memory;
    means for sending a plurality of packets in response to receiving a service request, each of the plurality of packets identifying a different type of service via which to send a corresponding one of the plurality of response packets, wherein the type of service identifies a Service Provider of the Internet such that each of the plurality of response packets identifies a different one of a plurality of Service Providers of the Internet;

means for maintaining a mapping of each different type of service to an IP address, thereby enabling the service request to be processed via an IP address associated with a type of service identified in a first one of the plurality of packets to be received, wherein the type of service identified in the first one of the plurality of packets to be received identifies one of the plurality of Service Providers of the Internet; and means for providing the IP address of the one of the plurality of Service Providers of the Internet that is mapped to the type of service identified in the first one of the plurality of packets to be received;

wherein maintaining the mapping comprises maintaining a plurality of A-records, each of the A-records having a type of service field adapted for indicating a type of service that corresponds to one of the plurality of Service Providers of the Internet and wherein receiving the request comprises receiving a DNS A-record request.

7. A network device adapted for processing a DNS request, comprising:

a processor; and a memory, at least one of the processor or the memory being adapted for:

receiving a DNS request indicating a domain name for which an IP address is requested;

transmitting a plurality of DNS responses in response to the DNS request, each of the plurality of DNS responses being transmitted via a different path associated with a different type of service, wherein the type of service identifies or is mapped to a Service Provider of the Internet such that each of the plurality of DNS responses is transmitted via a different one of a plurality of Service Providers of the Internet; and wherein transmitting a plurality of DNS responses comprises transmitting the plurality of DNS responses to a client DNS server associated with a client initiating the DNS request;

wherein the client DNS server is configured to identify a first one of the plurality of DNS responses to be received from the network device and to respond with an IP address of the one of the plurality of Service Providers of the Internet corresponding to the type of service identified in the first one of the plurality of DNS responses, thereby enabling the IP address of the one of the plurality of Service Providers of the Internet via which the first one of the plurality of DNS responses has been received to be provided;

wherein the client DNS server is further configured to obtain the type of service from the first one of the plurality of DNS responses and obtain an IP address of the one of the plurality of Service Providers corresponding to the type of service from a mapping table.

8. The network device as recited in claim 7, wherein each of the plurality of DNS responses has the same source address and destination address.

9. The network device as recited in claim 7, at least one of the processor or the memory being further adapted for:

providing a service identifier in each of the plurality of DNS responses, the service identifier identifying one of the plurality of Service Providers that is to be used to route the corresponding DNS response.

10. The network device as recited in claim 7, wherein each of the plurality of DNS responses comprises a type of service field adapted for indicating a type of service to be used during next-hop based routing based on the type of service.

11. A method of processing a DNS request, comprising:

receiving by a network device a DNS request indicating a domain name for which an IP address is requested;

transmitting by the network device a plurality of DNS responses in response to the DNS request, each of the plurality of DNS responses being transmitted via a different path associated with a different type of service, wherein the type of service identifies or is mapped to a Service Provider of the Internet such that each of the plurality of DNS responses is transmitted via a different one of a plurality of Service Providers of the Internet; and providing an IP address of the one of the plurality of Service Providers of the Internet via which a first one of the plurality of DNS responses to be received has been transmitted;

wherein transmitting a plurality of DNS responses comprises transmitting the plurality of DNS responses to a client DNS server associated with a client initiating the DNS request;

wherein the client DNS server is configured to identify a first one of the plurality of DNS responses to be received from the network device and to respond with an IP address of the one of the plurality of Service Providers of the Internet corresponding to the type of service identified in the first one of the plurality of DNS responses;

wherein the client DNS server is further configured to obtain the type of service from the first one of the plurality of DNS responses and obtain an IP address of the one of the plurality of Service Providers corresponding to the type of service from a mapping table.

12. The method as recited in claim 11, wherein each of the plurality of DNS responses includes a different one of a plurality of IP addresses, each of the plurality of IP addresses being mapped to a different one of the plurality of Service Providers of the Internet.

13. The method as recited in claim 11, wherein receiving a DNS request comprises receiving a DNS A-record request and wherein transmitting a plurality of DNS responses comprises transmitting a plurality of A-records.

14. The method as recited in claim 13, wherein each of the plurality of A-records includes a different IP address that is mapped to a different one of the plurality of Service Providers of the Internet.

15. The method as recited in claim 14, wherein each of the plurality of A-records further includes a field adapted for identifying the one of the plurality of Service Providers of the Internet.

16. The method as recited in claim 15, further comprising: maintaining a table of A-records that includes the plurality of A-records.

17. The method as recited in claim 11, wherein transmitting the plurality of DNS responses comprises transmitting the plurality of DNS responses via one or more intermediate routers configured to perform next-hop policy based routing based on the type of service.

18. A non-transitory computer-readable medium comprising memory storing thereon instructions for processing a DNS request in a network device, the computer-readable medium storing thereon the following instructions:

instructions for processing a DNS request that has been received, the DNS request indicating a domain name for which an IP address is requested;

instructions for transmitting a plurality of DNS responses in response to the DNS request, each of the plurality of DNS responses being transmitted via a different path associated with a different type of service, wherein the type of service identifies or is mapped to a Service Provider of the Internet such that each of the plurality of DNS responses is transmitted via a different one of a plurality of Service Providers of the Internet; and instructions for providing an IP address of the one of the plurality of Service Providers of the Internet via which a first one of the plurality of DNS responses to be received has been transmitted;

wherein transmitting a plurality of DNS responses comprises transmitting the plurality of DNS responses to a client DNS server associated with a client initiating the DNS request;

wherein the client DNS server is configured to identify a first one of the plurality of DNS responses to be received from the network device and to respond with an IP address of the one of the plurality of Service Providers of the Internet corresponding to the type of service identified in the first one of the plurality of DNS responses;

wherein the client DNS server is further configured to obtain the type of service from the first one of the plurality of DNS responses and obtain an IP address of the one of the plurality of Service Providers corresponding to the type of service from a mapping table.

19. A system adapted for processing a DNS request, comprising:

a processor and a memory;

means for receiving a DNS request indicating a domain name for which an IP address is requested;

means for transmitting a plurality of DNS responses in response to the DNS request, each of the plurality of DNS responses being transmitted via a different path associated with a different type of service, wherein the type of service identifies or is mapped to a Service Provider of the Internet such that each of the plurality of DNS responses is transmitted via a different one of a plurality of Service Providers of the Internet; and means for providing an IP address of the one of the plurality of Service Providers of the Internet via which a first one of the plurality of DNS responses to be received has been transmitted;

wherein transmitting a plurality of DNS responses comprises transmitting the plurality of DNS responses to a client DNS server associated with a client initiating the DNS request;

wherein the client DNS server is configured to identify a first one of the plurality of DNS responses to be received from the network device and to respond with an IP address of the one of the plurality of Service Providers of the Internet corresponding to the type of service identified in the first one of the plurality of DNS responses;

wherein the client DNS server is further configured to obtain the type of service from the first one of the plurality of DNS responses and obtain an IP address of the one of the plurality of Service Providers corresponding to the type of service from a mapping table.

20. A system for selecting an Internet Service Provider via which to process a client request, comprising:

a network device comprising a processor adapted for receiving a DNS request indicating a domain name for which an IP address is requested and transmitting a plurality of DNS responses to a client DNS server associated with a client initiating the DNS request, each of the plurality of DNS responses being transmitted via a different path associated with a different type of service, wherein the type of service identifies a Service Provider of the Internet such that each of the plurality of DNS responses is transmitted via a different one of a plurality of Service Providers of the Internet;

one or more intermediate routers configured to perform next-hop policy based routing based on the type of service; and a client DNS server associated with a client initiating the DNS request, the client DNS server being configured to identify a first one of the plurality of DNS responses to be received from the network device and to respond to the client with an IP address of the one of the plurality of Service Providers of the Internet corresponding to the type of service identified in the first one of the plurality of DNS responses;

wherein the client DNS server is further configured to obtain the type of service from the first one of the plurality of DNS responses and obtain an IP address of the one of the plurality of Service Providers corresponding to the type of service from a mapping table.

21. A method, comprising:

receiving a plurality of DNS responses from a network device by a client DNS server, the plurality of DNS responses being transmitted by the network device in response to a DNS request indicating a domain name for which an IP address is requested, wherein the client DNS server is associated with a client initiating the DNS request, each of the plurality of DNS responses being transmitted via a different path associated with a different type of service, wherein the type of service identifies or is mapped to a Service Provider of the Internet such that each of the plurality of DNS responses is transmitted via a different one of a plurality of Service Providers of the Internet; and providing by the client DNS server an IP address of the one of the plurality of Service Providers of the Internet via which a first one of the plurality of DNS responses to be received has been transmitted;

wherein the client DNS server is configured to identify a first one of the plurality of DNS responses to be received from the network device and to respond with an IP address of the one of the plurality of Service Providers of the Internet corresponding to the type of service identified in the first one of the plurality of DNS responses;

wherein the client DNS server is further configured to obtain the type of service from the first one of the plurality of DNS responses and obtain an IP address of the one of the plurality of Service Providers corresponding to the type of service from a mapping table.

22. A method, comprising:

receiving a plurality of DNS responses from a network device by a client DNS server, the plurality of DNS responses being transmitted by the network device in response to a DNS request indicating a domain name for which an IP address is requested, wherein the client DNS server is associated with a client initiating the DNS request, each of the plurality of DNS responses being transmitted via a different path associated with a different type of service, wherein the type of service identifies or is mapped to a Service Provider of the Internet such that each of the plurality of DNS responses is transmitted via a different one of a plurality of Service Providers of the Internet;

identifying by the client DNS server a first one of the plurality of DNS responses to be received from the network device;

obtaining by the client DNS server the type of service from the first one of the plurality of DNS responses to be received from the network device;

obtaining by the client DNS server an IP address of the one of the plurality of Service Providers corresponding to the type of service from a mapping table; and providing by the client DNS server the IP address of the one of the plurality of Service Providers of the Internet corresponding to the type of service identified in the first one of the plurality of DNS responses, thereby providing an IP address of the one of the plurality of Service Providers of the Internet via which a first one of the plurality of DNS responses to be received has been transmitted.

23. The method as recited in claim 22, wherein each of the plurality of DNS responses includes a different one of a plurality of IP addresses, each of the plurality of IP addresses being mapped to a different one of the plurality of Service Providers of the Internet.

24. The method as recited in claim 22, wherein each of the plurality of DNS responses has the same source address and destination address.

25. The method as recited in claim 22, wherein each of the plurality of DNS responses includes a service identifier in, the service identifier identifying one of the plurality of Service Providers that is to be used to route the corresponding DNS response.

26. The method as recited in claim 22, wherein each of the plurality of DNS responses comprises a type of service field adapted for indicating a type of service to be used during next-hop based routing based on the type of service.

27. The method as recited in claim 22, wherein the DNS request includes a DNS A-record request and each of the plurality of DNS responses includes an A-record.

28. The method as recited in claim 27, wherein each of the plurality of DNS responses includes a different IP address that is mapped to a different one of the plurality of Service Providers of the Internet.

29. The network device as recited in claim 27, wherein each of the plurality of DNS responses includes a field adapted for identifying the one of the plurality of Service Providers of the Internet.

30. An apparatus, comprising:
a processor; and
a memory, at least one of the processor or the memory being adapted for:
receiving a plurality of DNS responses from a network device by a client DNS server, the plurality of DNS responses being transmitted by the network device in response to a DNS request indicating a domain name for which an IP address is requested, wherein the client DNS server is associated with a client initiating the DNS request, each of the plurality of DNS responses being transmitted via a different path associated with a different type of service, wherein the type of service identifies or is mapped to a Service Provider of the Internet such that each of the plurality of DNS responses is transmitted via a different one of a plurality of Service Providers of the Internet;

identifying by the client DNS server a first one of the plurality of DNS responses to be received from the network device;

obtaining by the client DNS server the type of service from the first one of the plurality of DNS responses to be received from the network device;

obtaining by the client DNS server an IP address of the one of the plurality of Service Providers corresponding to the type of service from a mapping table; and providing by the client DNS server the IP address of the one of the plurality of Service Providers of the Internet corresponding to the type of service identified in the first one of the plurality of DNS responses, thereby providing an IP address of the one of the plurality of Service Providers of the Internet via which a first one of the plurality of DNS responses to be received has been transmitted.

31. An apparatus, comprising:
a processor and a memory;
means for receiving a plurality of DNS responses from a network device by a client DNS server, the plurality of DNS responses being transmitted by the network device in response to a DNS request indicating a domain name for which an IP address is requested, wherein the client DNS server is associated with a client initiating the DNS request, each of the plurality of DNS responses being transmitted via a different path associated with a different type of service, wherein the type of service identifies or is mapped to a Service Provider of the Internet such that each of the plurality of DNS responses is transmitted via a different one of a plurality of Service Providers of the Internet;

means for identifying by the client DNS server a first one of the plurality of DNS responses to be received from the network device;

means for obtaining by the client DNS server the type of service from the first one of the plurality of DNS responses to be received from the network device;

means for obtaining by the client DNS server an IP address of the one of the plurality of Service Providers corresponding to the type of service from a mapping table; and means for providing by the client DNS server the IP address of the one of the plurality of Service Providers of the Internet corresponding to the type of service identified in the first one of the plurality of DNS responses, thereby providing an IP address of the one of the plurality of Service Providers of the Internet via which a first one of the plurality of DNS responses to be received has been transmitted.

\* \* \* \* \*